United States Patent
Dharmarajan

(10) Patent No.: US 7,313,587 B1
(45) Date of Patent: Dec. 25, 2007

(54) METHOD AND APPARATUS FOR LOCALIZING WEB APPLICATIONS

(75) Inventor: Baskaran Dharmarajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 923 days.

(21) Appl. No.: 10/619,208

(22) Filed: Jul. 14, 2003

(51) Int. Cl.
G06F 15/16 (2006.01)

(52) U.S. Cl. ............... 709/201; 709/203; 709/217; 709/231; 707/10; 704/7

(58) Field of Classification Search ........ 709/201–203, 709/217–219, 238, 226, 229, 231; 707/2–3, 707/10; 704/2–3, 7–8
See application file for complete search history.

(56) References Cited

U.S. PATENT DOCUMENTS

| | | | |
|---|---|---|---|
| 5,613,145 A * | 3/1997 | Kaplan et al. ............. 715/533 |
| 6,031,995 A * | 2/2000 | George ..................... 717/166 |
| 6,119,078 A | 9/2000 | Kobayakawa et al. |
| 6,278,992 B1 * | 8/2001 | Curtis et al. ................ 707/3 |
| 6,490,547 B1 * | 12/2002 | Atkin et al. .................. 704/8 |
| 6,492,995 B1 | 12/2002 | Atkin et al. |
| 6,515,598 B2 * | 2/2003 | Parenteau et al. ........... 341/60 |
| 6,530,039 B1 | 3/2003 | Yang |
| 6,542,933 B1 * | 4/2003 | Durst et al. ............... 709/229 |
| 6,965,968 B1 * | 11/2005 | Touboul ................... 709/229 |
| 7,146,429 B2 * | 12/2006 | Michel ..................... 709/238 |

* cited by examiner

Primary Examiner—Bharat Barot
(74) Attorney, Agent, or Firm—Lee & Hayes, PLLC

(57) ABSTRACT

A system receives a file index associated with multiple localized strings of data and loads the file index into a memory device. The system then identifies pointers to frequently used localized strings and caches the identified pointers. Requests for Web content are then processed by the system.

29 Claims, 6 Drawing Sheets

METHOD AND APPARATUS FOR LOCALIZING WEB APPLICATIONS

TECHNICAL FIELD

The systems and methods described herein relate to Web servers and, more particularly, to localizing content distributed by Web applications executing on a Web server.

BACKGROUND

Web servers may be accessed by users in any part of the world. Users accessing a particular Web server may communicate using any number of different languages. To support users around the world, it is necessary to have a "global" Web server that supports numerous languages. Such a Web server should be capable of distributing content in multiple different languages.

Certain existing Web servers support multiple languages by duplicating all content for each language or locale. This approach leads to a large number of files that may become difficult to manage, especially when a large number of languages or locales are supported. Further, as the content stored on the Web server increases, the duplicated content increases at a greater magnitude. Large amounts of content on a Web server require corresponding storage space on hard disk drives and other memory devices. As the amount of content stored on a Web server increases, the performance of the Web server may decrease.

Accordingly, it is desirable to provide an architecture that efficiently handles localization of content distributed by Web servers.

SUMMARY

The systems and methods described herein localize content generated by one or more Web-based applications executing on a Web server. In one embodiment, a system receives a file index associated with multiple localized strings of data. The file index is loaded into a memory device. Pointers to frequently used localized strings are identified and cached in a cache device. At this point, the system is ready to begin processing requests for Web content.

BRIEF DESCRIPTION OF THE DRAWINGS

Similar reference numbers are used throughout the figures to reference like components and/or features.

DETAILED DESCRIPTION

The systems and methods discussed herein localize Web applications on a Web server. Typical Web servers represent resources as strings, HTML text, or URL text. The systems and methods described herein utilize a file format designed to store string resources, which enables localization to become a relatively simple process for Web applications. Each file in the new file format is composed of three elements: a string list, a string index, and a file index. To localize a Web page (or any other content), a resource is created and the string information is entered into the file format. The file index is loaded into memory and pointers to string indexes for common languages and locales are cached, thereby improving the performance of the Web server. For situations where the string index is already loaded in the cache, a single call is able to access the desired value. If the string index is not already loaded in the cache, two seek operations are executed to access the desired value. Thus, the new localized Web pages are quickly accessible. The system is able to seek to a string resource within a maximum of two seek operations.

Although particular examples discussed herein relate to Hotmail (an email service provided by Microsoft Corporation of Redmond, Wash.), the systems and methods described herein can be used with any email system or any other application, such as other Web-based applications. Further, particular examples described herein include a Web server. However, in alternate embodiments, the systems and methods discussed herein can be applied to any type of server or other computing system.

Figure 1:
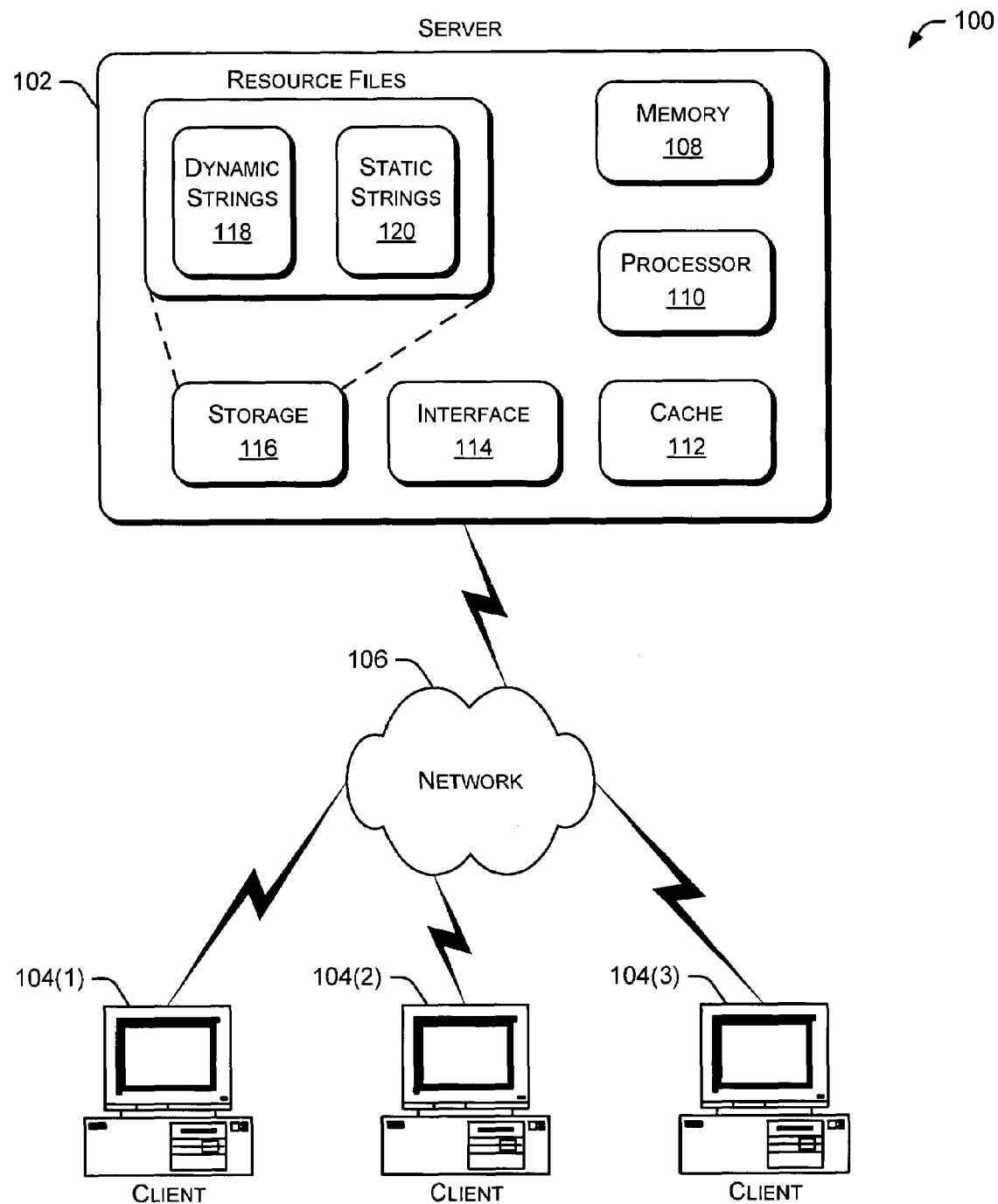
FIG. 1 is a block diagram of an exemplary network environment including a server and multiple clients.

FIG. 1 is a block diagram of an exemplary network environment 100 including a server and multiple clients. A server 102 and multiple clients 104 are coupled to a data communication network 106. Clients 104 communicate with server 102 via network 106. For example, clients 104 may execute a browser application that communicates with server 102. Network 106 may include one or more subnetworks coupled to one another. In a particular embodiment, network 106 is the Internet and server 102 is a Web server. Although one server 102 and three clients 104 are shown in FIG. 1, specific implementations may include any number of servers 102 coupled to any number of clients 104 via one or more networks 106.

Server 102 includes a memory 108, a processor 110, a cache 112, an interface 114 and a storage device 116. Memory 108 stores data used by the server and generated by the server as it performs various functions. Processor 110 executes instructions that allow the server to perform certain functions. Cache 112 is a high-speed memory device that allows processor 110 to quickly access frequently used data. Interface 114 allows server 102 to communicate with other devices via network 106 or other communication links. Storage device 116 is, for example, a hard disk drive or other non-volatile storage device capable of storing data used by server 102.

As shown in FIG. 1, storage device 116 contains resource files represented by dynamic strings 118 and static strings 120. Additional details regarding these resources files are provided below. Particular embodiments may include additional resource files not shown in FIG. 1.

The resource files shown in FIG. 1 contain the string values for IDs in a compact manner such that the string value for a particular ID can be located efficiently and quickly for a particular locale. The resource files define the file structure used to perform localization of Web applications. In one embodiment, the system uses two resources files: one resource file contains the strings that can be updated dynamically (i.e., a new file with a new set of string values can be hot-swapped with the existing file so that the same string IDs are associated with fresh string values). The other resource file contains the strings that are part of the user interface and do not typically change between software releases (e.g., the static strings). For example, the static strings can represent information that changes infrequently, such as a Web site home page, an email inbox page, menu items, or a listing of available folders. The dynamic strings represent information that changes more frequently than the static strings. The type of information represented by the dynamic strings includes current news headlines, current local weather, or marketing offers. In one embodiment, static strings are used for typical web site content that does not change in between software releases.

Although particular embodiments discussed herein contain separate files for dynamic strings and static strings, alternate embodiments may combine the dynamic strings and the static strings in a single file.

Figure 2:
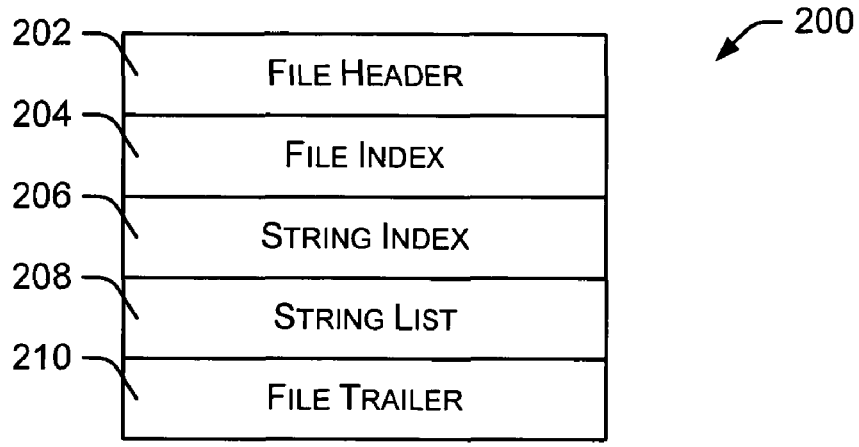
FIG. 2 illustrates an example file structure used by the systems and methods discussed herein.

FIG. 2 illustrates an example file structure 200 used by the systems and methods discussed herein. A file header field 202 identifies the length of a file index. A file index field 204 is an array of locales with offsets to a corresponding 19 string index. A string index field 206 is an array of offsets into the string list for each ID. A separate string index is provided for each locale. String list field 208 identifies the string value for the various IDs. A separate string list is provided for each locale. A file trailer field 210 identifies verification information used to verify file content.

Figure 3:
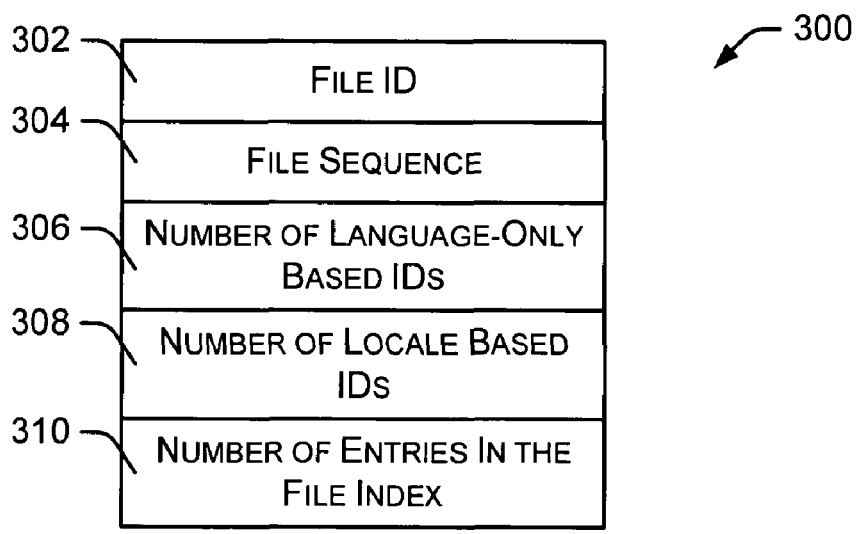
FIG. 3 illustrates an example file header.

FIG. 3 illustrates an example file header 300. File header 300 contains 20 bytes of information (e.g., four bytes of information for each of the five fields). A file ID field 302 identifies each particular file. An example file ID is "1045633215". A file sequence field 304 identifies the sequence information. The sequence information indicates whether the file has an associated file trailer (e.g., file trailer 210 in FIG. 2). The next field 306 identifies the number of language-only based IDs are contained in the current file. A particular embodiment may contain two language-only based IDs. Another field 308 identifies the number of locale based IDs contained in the current file. For example, a file may contain three locale based IDs. The last field 310 identifies the number of entries contained in the file index for the current file. For example, a file may contain five entries in the file index.

At runtime, when the file is first loaded, the Web server reads the file header, obtains the file index length and loads the file index, which follows the header.

Figure 4:
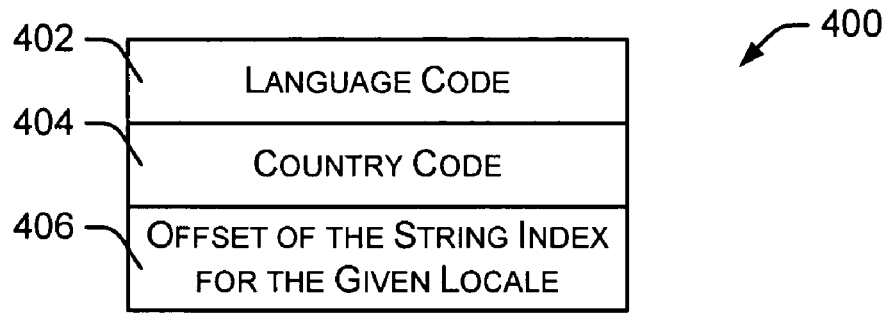
FIG. 4 illustrates an example file index.

FIG. 4 illustrates an example file index 400. The file index is a list of file entries. Each file entry contains the locale and the offset of the string index for that language-locale. A language code 402 is a two-character code identifying a particular language. A country code 404 is a two-character code identifying a specific country. The country code "00" indicates that there is no country code (e.g., the file is language-specific but not country-specific). For example, a code "EN00" indicates English (EN) and no locale (00). Similarly, a code "ESMX" indicates Mexican (MX) Spanish (ES). Offsets are measured from the beginning of the file. For example, if "EN00" has an offset of 24, that offset indicates that the English string index begins at offset 24.

To identify the value for a given string, at runtime the Web server will look for the entry for the locale in question to obtain the index to the string index, discussed below. To improve the speed of this look-up operation, the file index entries are sorted by locale such that a binary search can be performed.

Figure 5:
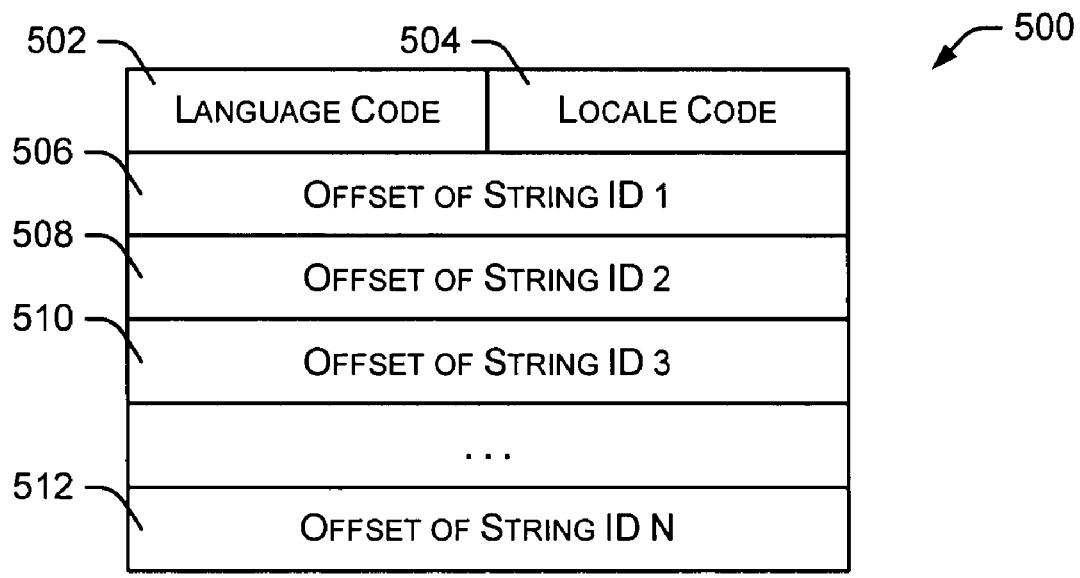
FIG. 5 illustrates an example string index.

FIG. 5 illustrates an example string index 500. String index 500 contains a header followed by a list of string index entries. The header is indicted as fields 502 and 504 in FIG. 5. The header includes a language code 502 and a locale code 504. The header is followed by the base offset of the string list for that locale and the length of the list of string index entries. The entries 506, 508, 510 and 512 are arranged in ascending order of string ID. Each entry is an offset to the location of the resource file, relative to the base offset, where the string for that particular ID can be found.

To access the string value for a particular ID, the Web server indexes into the offset list and obtains the offset to the string list. The Web server may cache pointers to the entry lists for commonly used locales, such as EN, ENUS (English—US), etc. in well-known read-only global variable so that the Server will not have to perform the same lookup repeatedly.

The string list 208 (FIG. 2) contains the values of the various string IDs stored in numerical order by string ID. The string list is a listing of string entries. Each string entry provides the string ID (e.g., for verification), one or more flags discussing the nature of the string value, the length of the string value and the actual string value itself. Each entry in the string list contains the following information:
String ID (4 bytes)
Flags (1 byte)
String Length (1 or 2 bytes)
String Value In one embodiment, if bit 0 of the flag byte is "0" then the string value is a simple string value. Otherwise, the string value is a compound value that requires additional interpretation, as discussed below. The string value is a sequence of bytes that is as long as the String Length indicates.

A simple string value is a sequence of characters in which the values vary by language or locale. Thus, a particular string ID may have the value "Hello!!" in English and "Ole!!" in Spanish. In certain situations, these simple string values are not adequate to properly represent the values for a particular language or locale.

For example, suppose a particular Web page greets people in the English version using "Hello <%=first name %>, How are you doing today?" For this example, assume that the proper way to translate this phrase into language X is the equivalent of, "How are you doing today, <%=first name %>hello!" In this example, a simple string is not sufficient. A compound string is used to this type of situation.

Compound strings are sequences of text interspersed with application variable names. The compound string values are represented as a series of tag-length-value triplets. The tag is one byte, the length is two bytes, and the value varies and is determined by the prescribed length. If bit 0 of the tag is "0", the value is a simple text value. If bit 0 of the tag is "1", the value is an application variable. If a value is an application variable name, it is preceded by two bytes that prescribe its "ordinal number". The ordinal number is the order in which the variable was referred to in the English string. Thus, in localized versions, the order of the variables may change, but not the ordinal number.

The tag may also indicate an application variable index. In this situation, the length is set to four bytes and the value identifies the application variable index instead of a variable name.

Each file ends with a file trailer 210 (FIG. 2). The file trailer contains two parts: file trailer data that identifies the trailer's data part, and a file trailer tail that identifies the fixed portions of the trailer. The structure of the file trailer tail includes: a file version, a file ID, and a file sequence. The file trailer data includes the file size (in bytes) and a file checksum. In a particular embodiment, the file checksum includes four bytes containing the 32 bit Cyclic Redundancy Check (CRC) for everything preceding the checksum field.

Thus, the software application that reads the resource files can seek to the last 12 bytes of the file and can verify that the trailer matches with the header and the version identified in the trailer is a version that the software application supports (e.g., the software application can understand the identified version). At this point, the software application knows the size of the trailer data and can seek to the trailer data and verify that the file size actually matches the size of the resource files. Additionally, the software application can calculate the checksum for the file contents and verify that it matches the checksum data in the file, thereby verifying that the file has not been corrupted.

When a developer needs to create a new string, the developer accesses an appropriate Web page an enters the new string value (e.g., "Hello!"). The developer specifies whether the string will vary based on language or locale. In this example, the string is a language-based string. The information is entered into a database and is assigned an ID if a string with the value "Hello!" does not already exist. For example, the ID may be S01, where "S" indicates a static ID. Dynamic IDs are part of the dynamic RCR process and their values are derived from files pushed as part of that process. The second character of the ID ("01" in this example) is based on language (0) or locale (1). At this point, the developer takes the ID and inputs it in the ASPL (Active Server Page Language or Active Server Page Lite language used by the Hotmail service) page at the appropriate location. The syntax for the ID is:

<%=@ID\description %>

Where:

| | |
|---|---|
| <%= | identifies the opening of the substitution |
| @ | signals the presence of a resource ID |
| \ | is a separator between the ID portion and the description portion |
| description | is any sequence of characters except the sequence "%>" |
| %> | identifies the ending of the substitution |

In the example discussed above, the ID may be:

<P>
<%=@S01\The string "Hello!"%>
<P>

In alternate embodiments, other languages may be utilized. These other languages may use a syntax that differs from the syntax described above.

Figure 6:
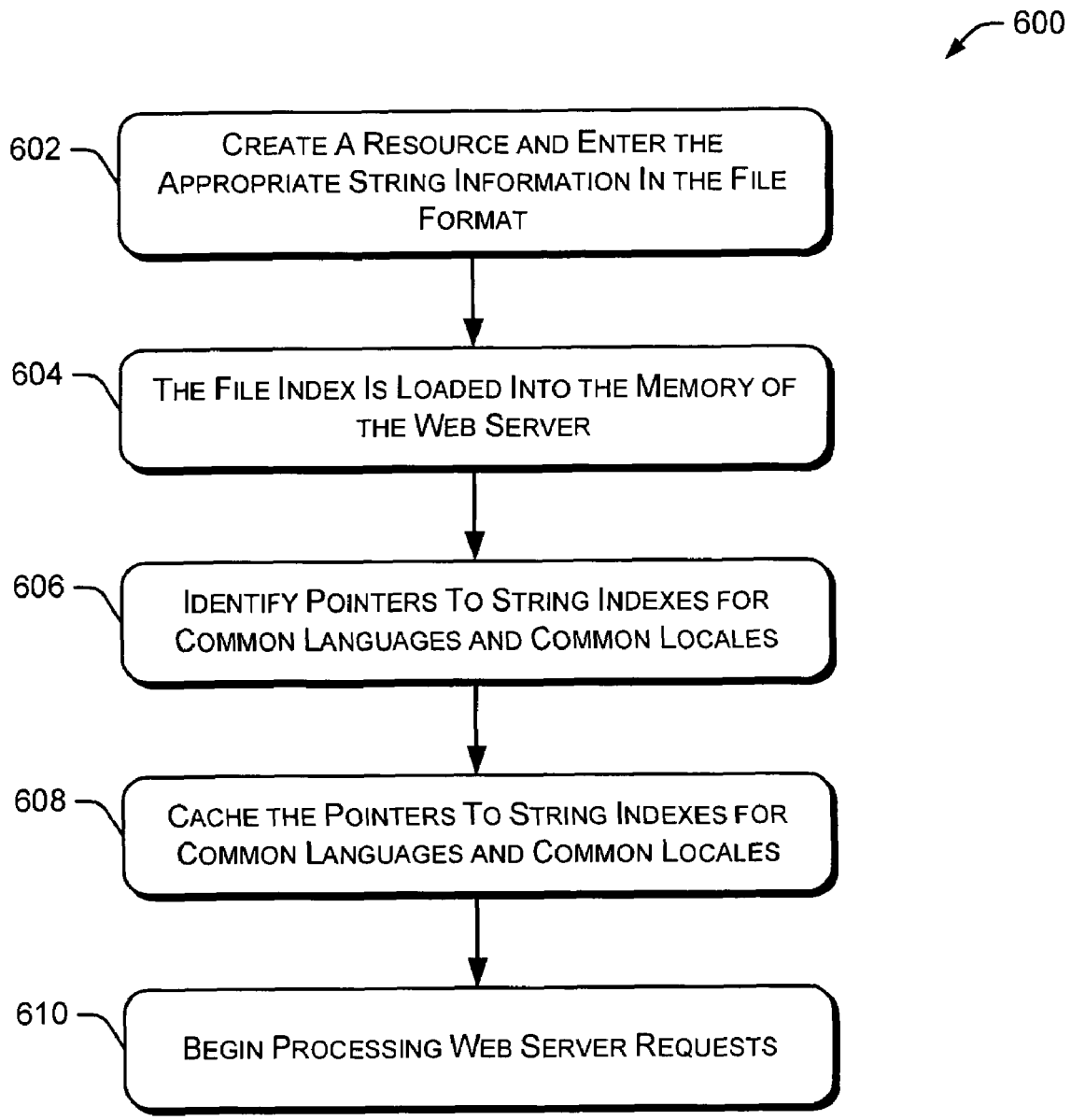
FIG. 6 is a flow diagram illustrating an embodiment of a procedure for creating a resource.

FIG. 6 is a flow diagram illustrating an embodiment of a procedure 600 for creating a resource. Initially, a resource is created and the appropriate string information is entered into the file format described above (block 602). When the Web server begins execution, the file index is loaded into the memory of the Web server (block 604). The procedure identifies pointers to string indexes for common languages and common locales (block 606). Common languages and common locales can be identified by analyzing past usage statistics, expected future usage, and the like. These pointers to string indexes for common languages and common locales are cached to improve the performance of the Web server (block 608). The Web server then begins receiving and processing various Web server requests (block 610), such as requests for particular Web pages or other content accessible via the Web server.

Figure 7:
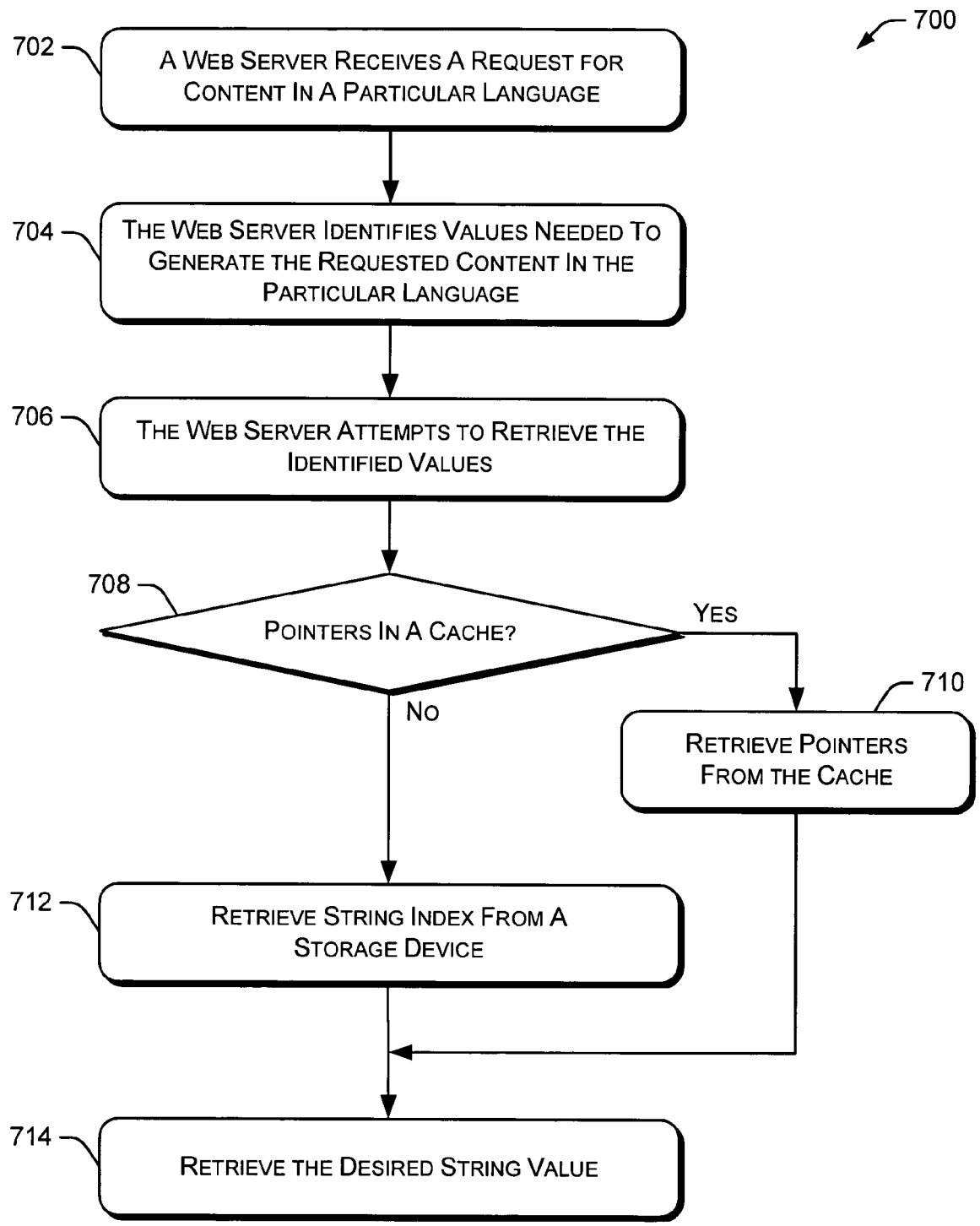
FIG. 7 is a flow diagram illustrating an embodiment of a procedure for processing a request for data.

FIG. 7 is a flow diagram illustrating an embodiment of a procedure 700 for processing a request for data. Initially, a Web server receives a request for content in a particular language (block 702). The requested content may be a Web page or any other data. The Web server identifies strings and/or other values needed to generate the requested content in the particular language (block 704). The Web server attempts to retrieve the identified values (block 706).

The procedure determines whether the pointers to string indexes for common languages and common locales are contained in a cache (block 708). If so, the procedure retrieves those pointers from the cache (block 710). Otherwise, the procedure retrieves an appropriate string index from a storage device (block 712), such as storage device 116 shown in FIG. 1. The procedure finishes by retrieving the desired string value (block 714). At this point, the Web server is able to provide the requested content to the source of the request.

In alternate embodiments, commonly used strings may be cached to improve system performance. Caching of these strings may occur along with the caching of pointers and/or other data.

In a particular embodiment, memory mapping allows for the intelligent caching of files on a storage device such as a disk drive. The portions of the memory mapped file that are used frequently are stored in the memory for fast and easy access. The portions of the file that are unused or used infrequently remain on the storage device, ready to be loaded into memory when needed. File operations on memory operations become pointer operations, thereby eliminating the need to invoke file I/O functions and simplifying the code. The memory mapped nature of the files makes caching of data relatively simple because the operating system performs much of the necessary work.

An issue arises when dealing with dynamic files, which can change while the dynamic file is being accessed by an application program. To handle this situation, the dynamic files are copied to a temporary directory and a the copy of the dynamic files is memory mapped. To simplify the dynamic loading, a memory mapped file manager uses an array of file information entries, called the file information array, for each file that is memory mapped. Each entry in the array stores information about the memory mapped file such as the file handle, pointer to the view at which the file is mapped, etc. The memory mapped file manager also maintains a pointer to the entry currently in use (called the "current pointer").

The files to be memory mapped are located in a single directory reserved for memory mapped files. Each file that is to be memory mapped is copied to the reserved directory and memory mapped. The memory map information is copied into one of the entries in the file information array and the current pointer is set to point at this entry. After all of the files are mapped, a file watcher logic is invoked on the directory containing the memory mapped files.

The file watcher logic will asynchronously watch the directory in which the resource files are contained. If any of the memory mapped files are modified, a callback function is invoked. The callback function first looks for a free entry in the array of file information entries. If no free entry is present, the callback function closes the least recently used entry and uses that entry to map the new file. After loading the entry, the callback function points the pointer to the new entry in a single operation. Any threads using the entry pointed to by the current pointer previously can continue without being aware of the change in the value of the pointer. Any thread that accesses the entry pointed to by the current pointer after the callback function points the pointer to the new entry will be using data from the new file.

Figure 8:
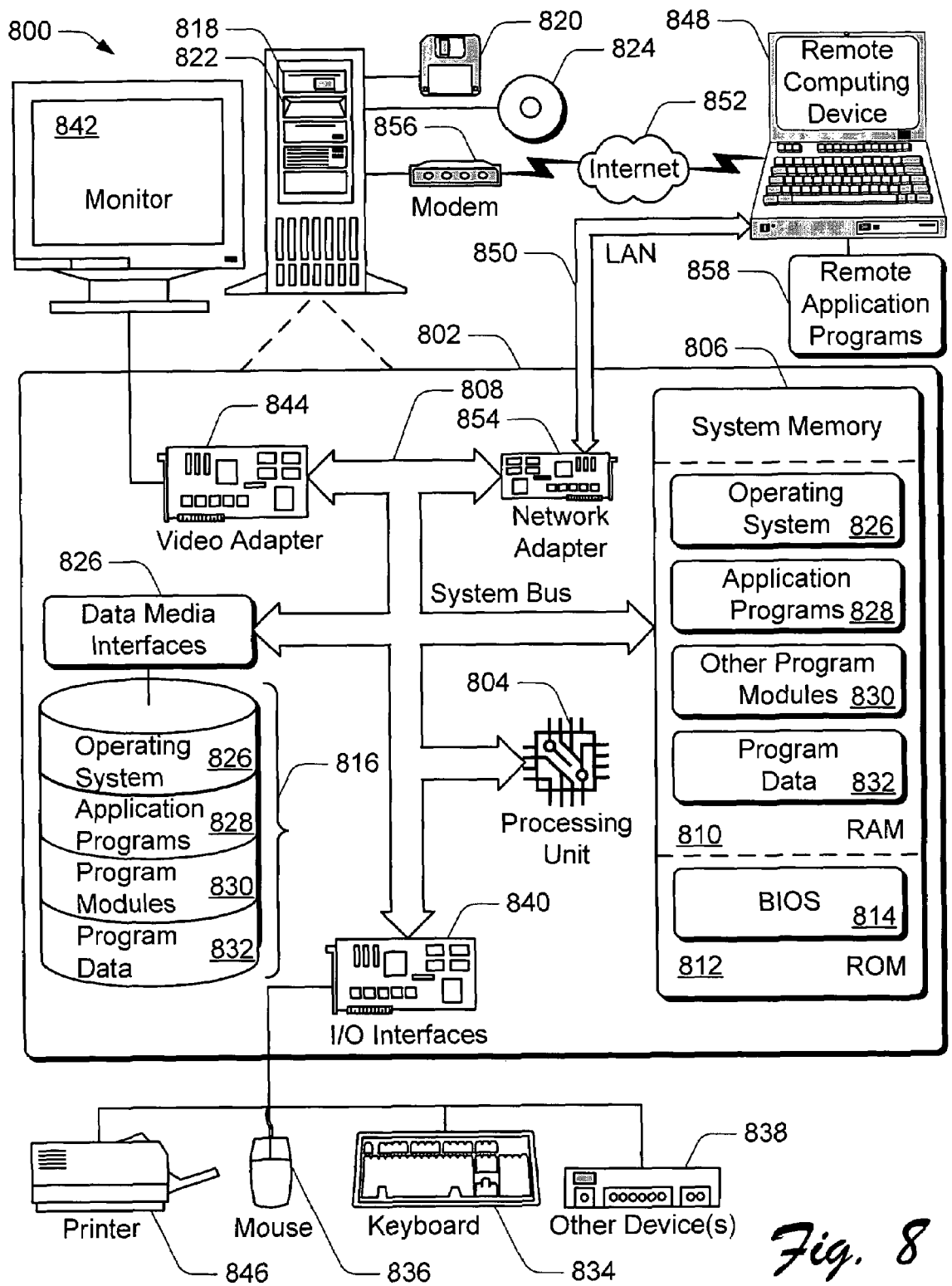
FIG. 8 illustrates a general computer environment, which can be used to implement the techniques described herein.

FIG. 8 illustrates a general computer environment 800, which can be used to implement the techniques described herein. The computer environment 800 is only one example of a computing environment and is not intended to suggest any limitation as to the scope of use or functionality of the computer and network architectures. Neither should the computer environment 800 be interpreted as having any dependency or requirement relating to any one or combination of components illustrated in the example computer environment 800.

Computer environment 800 includes a general-purpose computing device in the form of a computer 802. The components of computer 802 can include, but are not limited to, one or more processors or processing units 804, a system memory 806, and a system bus 808 that couples various system components including the processor 804 to the system memory 806.

The system bus 808 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 802 typically includes a variety of computer readable media. Such media can be any available media that is accessible by computer 802 and includes both volatile and non-volatile media, removable and non-removable media.

The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804.

Computer 802 may also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 826. Alternatively, the hard disk drive 816, magnetic disk drive 818, and optical disk drive 822 can be connected to the system bus 808 by one or more interfaces (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof) may implement all or part of the resident components that support the distributed file system.

A user can enter commands and information into computer 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 846 which can be connected to computer 802 via the input/output interfaces 840.

Computer 802 can operate in a networked environment using logical connections to one or more remote computers, such as a remote computing device 848. By way of example, the remote computing device 848 can be a personal computer, portable computer, a server, a router, a network computer, a peer device or other common network node, game console, and the like. The remote computing device 848 is illustrated as a portable computer that can include many or all of the elements and features described herein relative to computer 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet.

When implemented in a LAN networking environment, the computer 802 is connected to a local network 850 via a network interface or adapter 854. When implemented in a WAN networking environment, the computer 802 typically includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components such as the operating system are illustrated herein as discrete blocks, although it is recognized that such programs and components reside at various times in different storage components of the computing device 802, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
receiving at a Web server, a file index associated with a plurality of localized strings of data;
loading the file index into a memory device associated with the Web server;
identifying pointers to frequently used localized strings of the plurality of localized strings;
caching the identified pointers at the Web server, so that in response to a user request for Web content, a localized string responsive to the user request can be identified in a single call when identified by a cached pointer;
processing user requests for Web content which are received by the Web server; and
indicating results of the processing for display in response to the user requests.

2. A method as recited in claim 1 wherein each of the plurality of localized strings has an associated language.

3. A method as recited in claim 1 wherein each of the plurality of localized strings has an associated locale.

4. A method as recited in claim 1 wherein each of the plurality of localized strings has an associated language and an associated locale.

5. A method as recited in claim 1 wherein processing the user requests for Web content includes:
identifying at least one localized string associated with a request for Web content; and
validating the at least one localized string.

6. A method as recited in claim 5 further comprising using the at least one localized string to process requests for Web content if the at least one localized string is validated.

7. A method as recited in claim 1 wherein identifying pointers to frequently used localized strings includes identifying one or more commonly used languages.

8. A method as recited in claim 1 wherein identifying pointers to frequently used localized strings includes identifying one or more frequently requested locales.

9. One or more computer-readable memories containing a computer program that is executable by a processor to perform the method recited in claim 1.

10. A method comprising:
receiving at a Web server, a request from a client for content in a particular language, wherein the Web server includes a file index associated with a plurality of localized strings, and further includes a cache of identifying pointers to frequently used localized strings of the plurality of localized strings, so that a string resource responsive to the request can be identified in a single call when identified by a cached pointer;
identifying from the request, at least one string associated with the requested content, wherein the at least one string is associated with the particular language;
determining whether a pointer to the at least one string is stored in the cache;
if the pointer is stored in the cache:
retrieving the pointer from the cache; and
retrieving the at least one string using the pointer;
if the pointer is not stored in the cache, retrieving the at least one string from a storage device; and
indicating content referenced by the at least one string for display in response to the request.

11. A method as recited in claim 10 further comprising generating the content referenced by the at least one string.

12. A method as recited in claim 10 further comprising validating the at least one string.

13. A method as recited in claim 10 wherein the at least one string has an associated locale.

14. A method as recited in claim 10 wherein retrieving the at least one string from a storage device includes:
identifying a string index associated with the at least one string; and
locating the at least one string using the string index.

15. One or more computer-readable memories containing a computer program that is executable by a processor to perform the method recited in claim 10.

16. A method comprising:
receiving at a Web server, a request from a client for content in a particular language, wherein the server includes a file index associated with a plurality of localized strings, and further includes a cache of identifying pointers to frequently used localized strings of the plurality of localized strings, so that a string resource responsive to the request can be identified in a single call when identified by a cached pointer;

identifying at least one string associated with the requested content, wherein the at least one string is associated with the particular language;

determining the at least one string is stored in the cache;

retrieving the at least one string from the cache; and indicating results of the retrieving for display in response to the request.

17. A method as recited in claim 16 further comprising providing the requested content to the client.

18. A method as recited in claim 16 further comprising validating the retrieved string to determine whether the retrieved string is corrupted.

19. A method as recited in claim 16 wherein retrieving the at least one string from a storage device includes:

identifying a string index associated with the at least one string; and locating the at least one string using the string index.

20. One or more computer-readable memories containing a computer program that is executable by a processor to perform the method recited in claim 16.

21. An apparatus comprising:

an interface to receive requests for Web content and to send responses to the received requests;

a cache to temporarily store pointers to frequently used localized strings of data, so that a string resource responsive to the user request can be identified in a single call when identified by a cached pointer; and a processor coupled to the interface and the cache, wherein the processor is configured to receive requests for Web content from the interface and receive pointers from the cache, wherein the processor is further configured to retrieve a particular localized string using a pointer if the cache contains a pointer to the particular localized string, and wherein the processor retrieves the particular localized string from a storage device the cache does not contain a pointer to the particular localized string.

22. An apparatus as recited in claim 21 wherein each localized string has an associated language.

23. An apparatus as recited in claim 21 wherein each localized string has an associated locale.

24. An apparatus as recited in claim 21 wherein the processor is further configured to validate localized strings.

25. One or more computer-readable storage media having stored thereon a computer program that, when executed by one or more processors, causes the one or more processors to:

receive at a Web server, a file index associated with a plurality of localized strings, wherein each of the plurality of localized strings has an associated language;

load the file index into a memory device associated with the Web server;

identify pointers to commonly used localized strings of the plurality of localized strings;

cache the identified pointers at the Web server, so that in response to a user request, a string resource responsive to the user request can be identified in a single call if identified by a cached pointer; and process user requests for localized data indicate results of the processing for display in response to the user requests.

26. One or more computer-readable storage media as recited in claim 25 wherein each of the plurality of localized strings has an associated locale.

27. One or more computer-readable storage media as recited in claim 25 wherein the one or more processors further:

identify at least one localized string associated with a request for localized data; and validate the at least one localized string.

28. One or more computer-readable storage media as recited in claim 25 wherein the one or more processors further:

identify at least one localized string associated with a request for localized data;

validate the identified localized string; and process the identified localized string if the identified localized string is validated.

29. One or more computer-readable storage media as recited in claim 25 wherein the commonly used localized strings are identified based on frequently requested languages.

* * * * *